US010099922B2

(12) United States Patent
Pach et al.

(10) Patent No.: US 10,099,922 B2
(45) Date of Patent: Oct. 16, 2018

(54) METHOD OF LOADING A VESSEL

(71) Applicant: JOHNSON MATTHEY PUBLIC LIMITED COMPANY, London (GB)

(72) Inventors: John David Pach, Cleveland (GB); Mikhail Victorovich Tararyshkin, Moscow (RU); Anatoly L'vovich Yelagin, Moscow (RU)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/110,422

(22) PCT Filed: Dec. 16, 2014

(86) PCT No.: PCT/GB2014/053707
§ 371 (c)(1),
(2) Date: Jul. 8, 2016

(87) PCT Pub. No.: WO2015/107322
PCT Pub. Date: Jul. 23, 2015

(65) Prior Publication Data
US 2016/0355399 A1  Dec. 8, 2016

(30) Foreign Application Priority Data

Jan. 17, 2014 (GB) .................................. 1400805.6

(51) Int. Cl.
*C10K 3/04* (2006.01)
*C01B 3/16* (2006.01)
(Continued)

(52) U.S. Cl.
CPC ................ *C01B 3/16* (2013.01); *B01J 8/003* (2013.01); *B01J 8/0415* (2013.01); *B01J 8/0469* (2013.01);
(Continued)

(58) Field of Classification Search
CPC .. C01B 3/323; C01B 3/16; C01B 3/40; C01B 3/586; C01B 2203/0233;
(Continued)

(56) References Cited

U.S. PATENT DOCUMENTS 3,091,520 A * 5/1963 Newburn .................. F02K 9/68
422/218
4,788,175 A 11/1988 Short et al.
(Continued)

FOREIGN PATENT DOCUMENTS

EP 0 285 887 A2 10/1988
GB 940960 A 11/1960
(Continued)

OTHER PUBLICATIONS

International Search Report, dated Mar. 4, 2015, from corresponding PCT application.
(Continued)

*Primary Examiner* — Amber R Orlando
*Assistant Examiner* — Syed T Iqbal
(74) *Attorney, Agent, or Firm* — Baker & Hostetler LLP

(57) ABSTRACT

A method for loading an axial-radial flow vessel containing a bed of a particulate catalyst having a radial-flow portion and an axial-flow portion supported on and in fluid communication with the radial flow portion, includes: (i) placing a first catalyst material in the radial-flow portion and (ii) placing a second catalyst material in the axial-flow portion, wherein the second catalyst material has a smaller particle size than the first catalyst material. A vessel loaded with first and second catalyst materials is also described.

21 Claims, 2 Drawing Sheets

Figure 1:
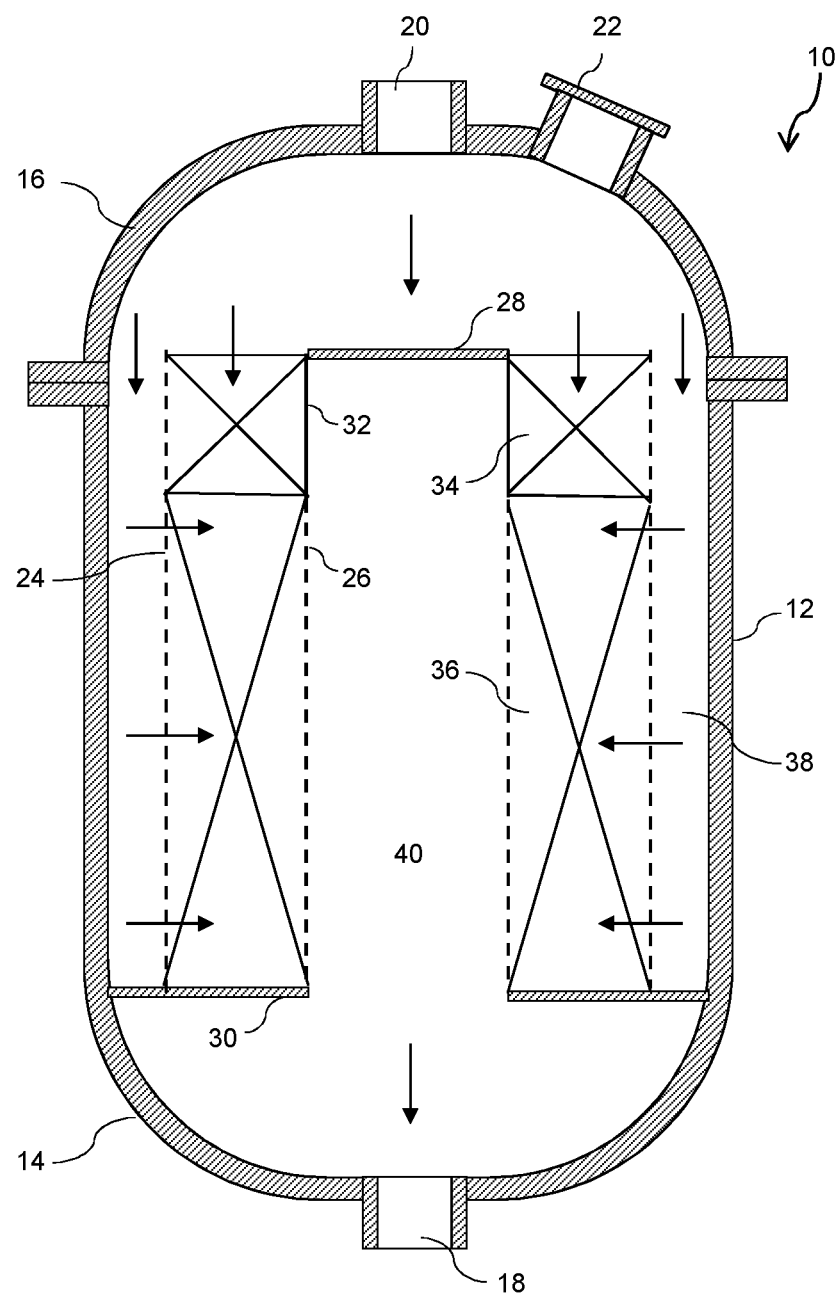

(51) Int. Cl.
  *B01J 8/04* (2006.01)
  *B01J 8/00* (2006.01)
  *C01B 3/40* (2006.01)
  *C01B 3/58* (2006.01)

(52) U.S. Cl.
  CPC .............. *B01J 8/0492* (2013.01); *C01B 3/40* (2013.01); *C01B 3/586* (2013.01); *C10K 3/04* (2013.01); *B01J 2208/00672* (2013.01); *B01J 2208/00752* (2013.01); *B01J 2208/025* (2013.01); *B01J 2219/00024* (2013.01); *C01B 2203/0233* (2013.01); *C01B 2203/0288* (2013.01); *C01B 2203/047* (2013.01); *C01B 2203/0445* (2013.01); *C01B 2203/1011* (2013.01); *C01B 2203/142* (2013.01)

(58) Field of Classification Search
  CPC .... C01B 2203/0288; C01B 2203/0445; C01B 2203/047; C01B 2203/1011; C01B 2203/142; B01J 8/0465; B01J 8/0264; B01J 8/0228; B01J 8/0278; B01J 8/0492; B01J 2208/00884; B01J 8/0411; B01J 2219/00024; B01J 2208/025; B01J 8/0292; B01J 8/0257; B01J 8/0214; B01J 8/0085; B01J 2208/00672; B01J 8/003; B01J 8/0415; B01J 8/0469; B01J 2208/00752; C10K 3/04
  See application file for complete search history.

(56) References Cited

U.S. PATENT DOCUMENTS

| | | |
|---|---|---|
| 5,184,386 A | 2/1993 | Zardi et al. |
| 5,372,792 A * | 12/1994 | Mueller .................. B01J 8/008 422/218 |
| 5,656,566 A | 8/1997 | Ward |
| 2006/0051277 A1 | 3/2006 | Schwefer et al. |
| 2006/0062706 A1 | 3/2006 | Ward |
| 2012/0079938 A1* | 4/2012 | Celik ................. B01D 53/0431 95/95 |
| 2014/0225037 A1* | 8/2014 | Hinton ..................... C01B 3/16 252/373 |

FOREIGN PATENT DOCUMENTS

| | | |
|---|---|---|
| GB | 1087987 A | 10/1967 |
| GB | 1213343 A | 4/1968 |
| WO | 01/23080 A1 | 4/2001 |
| WO | WO 0123080 A1 * | 4/2001 ........... B01J 8/0085 |
| WO | 03/105998 A1 | 12/2003 |
| WO | 2009078979 A | 6/2009 |

OTHER PUBLICATIONS

GB Search Report, dated Jun. 11, 2015, from corresponding GB application.

* cited by examiner

METHOD OF LOADING A VESSEL

This invention relates to a method for loading a vessel, particularly an axial-radial flow vessel, with a catalyst, the vessel so loaded, and its use.

Axial-radial flow vessels are known and generally comprise a domed cylindrical vessel with a process fluid inlet at one end and a process fluid outlet at the other and containing catalyst through which the process fluid flows first axially and then radially. This is generally achieved by using catalyst containment means within the vessel that form a peripheral void around the bed of catalyst and also form a central void within the bed of catalyst. The containment means allow the process fluid to flow onto the surface of the catalyst through which it passes axially for a portion of the bed and also into the peripheral void from which it is able to pass radially inwards through the catalyst in the remaining portion and into the central void. The central and peripheral voids are in fluid communication with the inlet or outlet to allow the process fluid to enter and leave the vessel. Such vessels are described, for example, in U.S. Pat. No. 5,184,386.

However often catalysts are susceptible to shrinkage, settling and movement in use and there is a risk that, as a result, the process fluid may by-pass the axial-flow portion of the bed and/or that axial portion of the bed may become insufficient for the desired duty. We have devised an arrangement that overcomes the problems of the prior art arrangement.

Accordingly the invention provides a method for loading an axial-radial flow vessel containing a bed of a particulate catalyst having a radial-flow portion and an axial-flow portion supported on and in fluid communication with the radial flow portion, by (i) placing a first catalyst material in the radial-flow portion and (ii) placing a second catalyst material in the axial-flow portion, wherein second catalyst material has a smaller particle size than the first catalyst material.

The invention further provides an axial-radial flow vessel containing a bed of a particulate catalyst having a radial-flow portion and an axial-flow portion supported on and in fluid communication with the radial flow portion, wherein the bed comprises a first catalyst material in the radial-flow portion and a second catalyst material in the axial-flow portion and the second catalyst material has a smaller particle size than the first catalyst material.

The invention further provides a process for performing a catalysed reaction by passing a process fluid through the axial-radial flow vessel containing the first and second catalyst.

Typically the vessel is operated in a down-flow arrangement in which case the vessel comprises a radial-flow portion below an axial-flow portion, and the method comprises placing the first catalyst material in the radial-flow portion and then placing the second catalyst material in the axial-flow portion. In an up-flow arrangement the opposite arrangement and method may be used.

The vessel typically comprises a cylindrical shell and first and second ends, which may be flat but are preferably domed. The internal diameter of the vessel may be in the range 0.5 to 6 meters, preferably 2 to 5 meters with a total length in the range 1 to 30 meters, in some cases 1 to 10 meters. The vessel may be fabricated from conventional materials such as steels suitable for use with the process fluids and capable of withstanding the process conditions. The vessel typically may be operated with the axis of the cylindrical shell aligned vertically, in which case the first and second ends may be described as the top or bottom ends. Preferably the first end is the bottom end and the second end the top end.

The vessel may comprise one or more axial-radial beds, each comprising a radial-flow portion and an axial-flow portion which may be loaded in accordance with the method of the present invention.

The vessel typically comprises one or more process fluid inlets. These may be located in the second end. A process fluid inlet at the second end is preferably located in-line with the axis of the cylindrical shell. A process fluid distributor may be connected to one or more of the inlets to distribute the process fluid evenly within the vessel. One or more process fluid outlets may be located at the first end. The one or more process fluid outlets open into the shell allow a process fluid to flow from the vessel for recovery and further processing. One or more catalyst discharge ports may also be present in the first end. One or more catalyst loading ports and/or man-holes may be provided in the second end. Alternatively, the second end may be detachably mounted on the shell, for example by means of a flange assembly to facilitate inspection, repair and catalyst loading and unloading.

The vessel contains catalyst bed having a radial-flow portion through which the flow of a process fluid is generally radially inwards or outwards, and an axial-flow portion through which the flow of process fluid is generally axial, i.e. parallel to the axis of the vessel. This may be achieved by use of catalyst containment means placed within the vessel. The containment means may comprise one or more perforate screens and imperforate baffles to direct the flow of process fluid from the inlet, through the axial-flow portion and through the radial-flow portion of the catalyst bed and to an outlet. Hence the containment means are desirably arranged within the shell such that a process fluid entering through a process fluid inlet passes to the second catalyst in the axial-flow portion and also to either a peripheral void from which it is able to pass radially inwards through the first catalyst to a central void, or to the central void from which it is able to pass radially outwards through the first catalyst to the peripheral void, from which it is able to pass to a process fluid outlet.

The central void may comprise a heat exchanger for exchanging heat between two process fluids or a coolant.

The axial-flow portion is supported on and in fluid communication with the radial-flow portion so that the process fluid once it has passed through the axial-flow portion passes directly to the radial-flow portion where it mixes with the process fluid passing radially inwards or outwards and the mixed process fluid is collected in the central void or peripheral void and passed to a process fluid outlet.

The containment means contain the axial-flow and radial-flow portions of the catalyst bed. The outside diameter of the catalyst bed contained by the containment means is less than the inside diameter of the vessel so that a peripheral void is formed around the catalyst bed. The containment means also provide a central void within the catalyst bed, and are perforate for a section so that a process fluid may flow from the peripheral void axially and radially, inwards or outwards, through the bed. The central axis of the catalyst bed is desirably the same as that of the vessel. Thus, the containment means desirably holds the particulate catalyst as an annular bed within the vessel and the central void is a cylindrical space. Preferably the bed thickness is in the range 0.1-0.45 D where D is the internal diameter of the vessel.

The axial-flow portion of the catalyst bed contains the second catalyst material. If desired, a portion of the second catalyst material may be replaced by the first catalyst material. However this portion is preferably <50%, more preferably <25%, most preferably <10% by volume of the axial-flow-portion. However, preferably the axial-flow portion consists only of the second catalyst material.

In one embodiment adapted for inward radial flow of the process fluid, the catalyst containment means comprises an outer perforate cylinder and an inner perforate cylinder, desirably of about the same length, said cylinders mounted within the vessel between two opposite non-perforate baffle plates, one baffle plate being of circular shape about the diameter of the inner cylinder and the other baffle plate being of annular shape with a width at least equal to the separation of the inner and outer cylinders, and preferably with a width equal to the distance between the inside wall of the shell and the inner perforate cylinder. The peripheral void is thus formed between the outer perforate cylinder and the inside wall of the shell, and the central void is provided within the inner perforate cylinder. The outer perforate cylinder may be replaced by a plurality of rigid perforate chordal-, semi-circular- or C-shaped plates, or tubes formed by such plates in combination with rigid non-perforate back-plates, that are arranged around the inside wall of the shell in order to provide the peripheral void. An inner perforate cylinder provides the central void, with non-perforate baffle plates mounted on said shaped plates or tubes and said central cylinder. This embodiment offers a number of advantages, particularly in larger vessels, for effective catalyst containment. The inner cylinder in each case may comprise a section at one end without perforations so that the flow through the portion bounding this section is axial. The section without perforations is preferably an upper section extending from the top of the catalyst bed into the catalyst bed. The depth of the axial flow portion of the catalyst bed is preferably less than or equal to the thickness of the radial-flow portion of the catalyst bed. For example, the non-perforate section of the inner cylinder may be up to about 25%, preferably up to about 20%, of the length of the catalyst bed. In this way the axial-flow portion and radial-flow portions may readily be generated. Alternative ways of creating the axial-flow portion include combining the circular baffle plate and a non-perforate cylinder as an insert into the upper part of the inner perforate cylinder that blocks radial-flow in the upper part of bed. The length of the non-perforate cylinder may then be varied to control the thickness of the axial-flow portion of the bed.

In an embodiment adapted for outward radial flow of the process fluid, the catalyst containment means comprises an outer perforate cylinder and an inner perforate cylinder, desirably of about the same length, said cylinders mounted within the vessel between two opposite non-perforate baffle plates, one baffle plate being of circular shape about the diameter of the outer cylinder and the other baffle plate being of annular shape with a width equal to the separation of the outer cylinder from the inside of the vessel wall. The peripheral void is thus again formed between the outer perforate cylinder and the inside wall of the shell, and the central void is provided within the inner perforate cylinder. Again the outer perforate cylinder may be replaced by a plurality of rigid perforate chordal-, semi-circular- or C-shaped plates, or tubes formed by such plates in combination with rigid non-perforate back-plates arranged around the inside wall of the shell in order to provide the peripheral void. The inner cylinder may comprise a section at one end without perforations, but in this embodiment preferably the outer cylinder or plates or tubes defining the peripheral void have a section without perforations so that the flow through the portion bounding this section is necessarily axial. The non-perforate section preferably is again preferably an upper section up to about 25%, preferably up to about 20%, of the length of the catalyst bed.

The outer and inner perforate cylinders may be formed from a perforate mesh, grid or screen, preferably made form a commercially-available V-wire, with orifices desirably smaller than the catalyst particle sizes to prevent catalyst losses.

If desired a perforate screen may optionally be placed between the first catalyst material and the second catalyst material. This may allow the different catalyst materials to be more readily segregated during loading and in particular unloading. However such a screen is not essential in the loading of the vessel according to the present invention.

The particulate catalyst materials may be granular, or may be pellets or extrudates. The granules, pellets or extrudates may have a width or diameter in the range 1-25 mm and an aspect ratio (i.e. length/diameter or width) ≤6. For example, cylindrical pellets or extrudates may be used, which may be fluted or lobed and have one or more through holes extending there-through. Preferred shapes are spheres, cylinders, rings, lobed cylinders, lobed rings, and fluted cylinders with 1-10 holes passing axially therethrough.

In the present invention, the particle size of the second catalyst material in the axial-flow portion is smaller than that of the first catalyst in the radial-flow portion. By "smaller particle size", we mean that the length and/or width and/or height of the second catalyst particles is less than that of the first catalyst material. For example in the case of spheres, the diameter of the second catalyst material is less than the first. In the case of cylinders, the diameter and/or length of the second catalyst material is less than the first. If the particles of first catalyst material have through holes, preferably the second catalyst material has smaller holes or fewer or no through holes. The particles of the second catalyst material preferably have a particle size (i.e. length and/or width and/or height) which is ≤80%, more preferably 50-80% of the first catalyst, e.g. a diameter and/or length that is 50-80% of the first catalyst. Particularly preferred second catalyst materials are cylindrical pellets, which may be lobed or fluted and contain one or more through-holes, with a diameter in the range 3-6 mm and a length in the range 2-4 mm.

Whereas U.S. Pat. No. 5,184,386 discloses that axial-radial vessels may use smaller catalyst particles than axial-flow vessels, this was because the conversion to radial flow reduces the pressure drop in the vessel and permits the smaller particles to be used. It does not suggest that particles smaller than those in the radial-flow portion of the bed should be used in the axial-flow portion of the catalyst bed. Indeed it may appear counter intuitive to use smaller catalyst particles in the axial-flow portion than are used in the radial-flow portion because this increases the resistance to flow in the axial-flow portion.

By having smaller catalyst particles in the second bed, the problems of shrinkage and by-pass are reduced. If the particles shrink in size, e.g. because of a chemical change, for example a reduction of a metal oxide to the metal, then the depth of the bed in the axial-portion is less affected than if the catalyst was the same as in the radial-portion. Moreover a smaller particle size, or fewer through-holes, in the second catalyst provides the axial-flow portion with a higher GSA and, hence with a higher activity and flow resistance thereby increasing the contact time with the process fluid in the axial-flow portion. This may allow increased conversion for the same bed thickness, or a thinner bed of catalyst may be used. Thinner beds offer savings in catalyst and potentially offer improvements in smaller reactor design and opportunities for re-vamping existing vessels, previously not thought suitable for conversion to axial-radial flow.

The catalyst may be loaded into the vessel using conventional loading techniques. For example, the first catalyst pellets or extrudates may be fed by gravity or under vacuum or under pressure by hose into the radial-flow portion of the vessel and then the second catalyst pellets or extrudates fed into the axial-flow portion of the vessel. A distributor may be attached to the catalyst loading apparatus to facilitate even loading of the catalyst. Additionally or alternatively the catalyst may be added manually by hand using buckets. Preferred catalyst loading methods include the so-called dense-loading techniques that use particle distributers to provide beds with enhanced packing of the catalyst particles. Such loading techniques are known and include Densicat® available from Mourik Inc and a loading technique available from the Boreskov Institute of Catalysis (BIC).

By using smaller particles of second catalyst in the axial-flow portion of the catalyst bed in combination with a dense-loading technique, the present invention also provides a more effective loading profile than where the only catalyst particles in the axial flow portion are the same as those on the radial-flow portion.

If desired, catalyst support balls or catalyst hold down balls may be placed at either end of the catalyst bed to facilitate flow of the process fluid to/from the catalyst.

The vessel may be used for any catalysed reaction, which may be exothermic or endothermic. Thus the vessel may be used for a wide variety of catalytic processes. For example, the process fluid fed to the vessel may comprise a hydrocarbon stream, a refinery stream, or a synthesis gas, including synthesis gases comprising hydrogen and carbon monoxide and/or carbon dioxide, and hydrogen and nitrogen. Steam may also be present in the process fluid.

The function of the catalyst materials present in the axial-flow and radial-flow portions of the bed may be the same or different.

Where the process fluid fed to the vessel is a hydrocarbon such as natural gas or naphtha, mixed with steam, the vessel may be used to convert higher hydrocarbons present in the hydrocarbon to methane by steam reforming reactions, in which case the first and second catalyst materials are nickel-containing pre-reforming catalysts.

Where the process fluid fed to the vessel is a synthesis gas, it may be reacted over a purification catalyst to remove contaminants or may be reacted over a suitable synthesis gas conversion catalyst to either change the hydrogen content of the synthesis gas, convert carbon oxides present in the synthesis gas into methane or to form methanol or ammonia, which may be recovered downstream. Thus in one embodiment the first and second catalyst materials are water-gas shift catalysts and the vessel is therefore a water-gas shift vessel. In another embodiment the first and second catalyst materials are methanation catalysts and the vessel is therefore a methanation vessel. In another embodiment the first and second catalyst materials are methanol synthesis catalysts and the vessel is therefore a methanol synthesis vessel. In yet another embodiment the first and second catalyst materials are ammonia synthesis catalysts and the vessel is therefore an ammonia synthesis vessel.

In a particularly preferred embodiment, the vessel is used for the water-gas shift reaction, used to increase or decrease the hydrogen content of synthesis gases. The water-gas shift reaction may be depicted as follows;

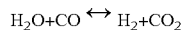

$$H_2O + CO \leftrightarrow H_2 + CO_2$$

This reaction is exothermic, and conventionally it has been allowed to run adiabatically, with control of the exit temperature governed by feed gas inlet temperature and composition. The water-gas shift catalyst may be a copper-zinc alumina low- or medium-temperature shift catalyst, an iron-containing high-temperature shift catalyst or a cobalt-containing sour shift catalyst.

The amount of steam should desirably be controlled such that the total steam: synthesis gas volume ratio in the synthesis gas mixture fed to the catalyst is in the range 0.2:1 to 4:1, preferably in the range 0.25:1 to 2.5:1.

The inlet temperature of the water-gas shift process may be in the range 190-390° C. The shift process is preferably operated adiabatically without cooling of the catalyst bed, although if desired some cooling may be applied for example by passing cooling water under pressure through tubes or plates disposed in the catalyst bed.

The process is preferably operated at elevated pressure in the range 1-100 bar abs, more preferably 15-50 bar abs.

Any suitable water-gas shift catalyst that is suitably active at the inlet temperature may be used.

In one embodiment, the first and second catalyst materials comprise a high-temperature shift catalyst comprising one or more iron oxides stabilised with chromia and/or alumina and which may optionally contain zinc oxide and one or more copper compounds. Traditional chromia-promoted magnetite catalysts may be used. Iron oxide/chromia shift catalysts are conventionally made by precipitation of iron and chromium compounds (that decompose to the oxides upon heating) from a solution of iron and chromium salts by the addition of a suitable alkaline reactant, e.g. sodium hydroxide or carbonate. The resulting precipitate is then washed, dried, and calcined and tableted to form catalyst precursor pellets. The precursor preferably has an iron oxide content (expressed as $Fe_2O_3$) of 60 to 95% by weight. Preferably the iron to chromium atomic ratio in the precursor is in the range 6 to 20, particularly 8 to 12. The precursor may contain oxides of other metals, e.g. aluminium, manganese, or, especially, copper. Particularly preferred precursors have an iron to copper atomic ratio of 10:1 to 100:1. Prior to use for the shift reaction, the pellets are subjected to reduction conditions wherein the iron oxide is reduced to magnetite ($Fe_3O_4$) and any chromium trioxide present reduced to the sesquioxide, chromia ($Cr_2O_3$). This reduction is often carried out in the reactor wherein the shift reaction is to be effected. The reduction results in shrinkage of the catalyst particles and therefore the present invention is of particular utility for iron-containing high temperature shift catalysts. We have found that the activity of the catalyst may be significantly increased by incorporating into the catalyst precursor particles of aspect ratio of at least 2 and a maximum dimension of at least 5000 Å (500 nm), and preferably less than 15000 Å (1500 nm) into the catalyst precursor pellets. Preferably the chromia-promoted magnetite catalyst comprises acicular iron oxide particles. Such catalysts are described in U.S. Pat. No. 5,656,566. Particularly suitable commercially available high temperature water gas shift catalysts are KATALCO$_{JM}$™ 71-5, KATALCO$_{JM}$™ 71-6, KATALCO$_{JM}$™, 71-5M and KATALCO$_{JM}$™ 71-6M available from Johnson Matthey PLC. The "M" notation indicates a smaller particle size catalyst suitable for use in the axial-flow portion of the bed of the present invention.

Alternatively, it may be desirable to at least part replace the chromia with alumina or another stabilising oxide. Zinc oxide and copper may desirably also be present. Such catalysts are described for example in WO2009078979.

In another embodiment the first and second catalyst materials comprise a low-temperature shift catalysts comprising copper, zinc oxide and alumina. Preferred catalysts are Cu/ZnO/alumina catalysts more preferably comprising copper (expressed as Cu atoms) of the active catalyst in the range 15-50% by weight, zinc oxide in the range 20-90% by weight, alumina in the range 5-60% by weight and optionally one or more promoters, such as alkali metal oxides. Particularly suitable catalyst and catalyst precursor compositions are described in U.S. Pat. No. 4,788,175. Particularly suitable commercially available high temperature water gas shift catalysts are KATALCO$_{JM}$™ 83-3, KATALCO$_{JM}$™ 83-3X, KATALCO$_{JM}$™ 83-3M and KATALCO$_{JM}$™ 83-3MX available from Johnson Matthey PLC. The "M" notation indicates a smaller particle size catalyst suitable for use in the axial-flow portion of the bed of the present invention.

In another embodiment, the first and second catalyst materials comprise a sour shift catalyst comprising 1-5% wt cobalt and 5-15% molybdenum, optionally with additional oxides such as magnesia and/or titanium dioxide, on a suitable support such as alumina or calcium aluminate. Such catalysts are often made by impregnating an oxidic support composition with cobalt and molybdenum compounds and heating the resulting composition to convert the cobalt and molybdenum compounds to their respective oxides. In use or before use if desired, the cobalt and molybdenum oxides may be sulphided with a suitable sulphur compound such as hydrogen sulphide. Such catalysts are described for example in GB 1087987, GB1213343 and GB940960. A particularly suitable commercially available sour shift catalyst is KATALCO$_{JM}$™ K8-11 available from Johnson Matthey PLC.

The vessel may be used alone, but is preferably used in combination with other water-gas shift vessels. In a preferred embodiment, the vessel is used in combination with one or more adiabatic or gas-cooled vessels, each containing a suitable water-gas shift catalyst.

The resulting shifted gas stream may be subjected to further processing including the steps of: cooling the shifted gas stream to below the dew point to condense water; separating the resulting condensate therefrom to form a dry shifted gas stream; feeding the dry shifted gas stream to a gas-washing unit operating by means of counter-current solvent flow, to produce a product synthesis gas enriched in hydrogen; and collecting the product synthesis gas from the washing unit.

After such further processing to remove water and adjust the carbon dioxide content, the product synthesis gas may be used in downstream processes for the production of ammonia, methanol, dimethylether (DME), Fischer-Tropsch (FT) liquids or substitute natural gas (SNG). Where a higher degree of water-gas shift is required, for example when making hydrogen for ammonia synthesis or a low carbon content fuel for combustion in a gas turbine, additional water-gas shift steps may be performed.

Figure 2:
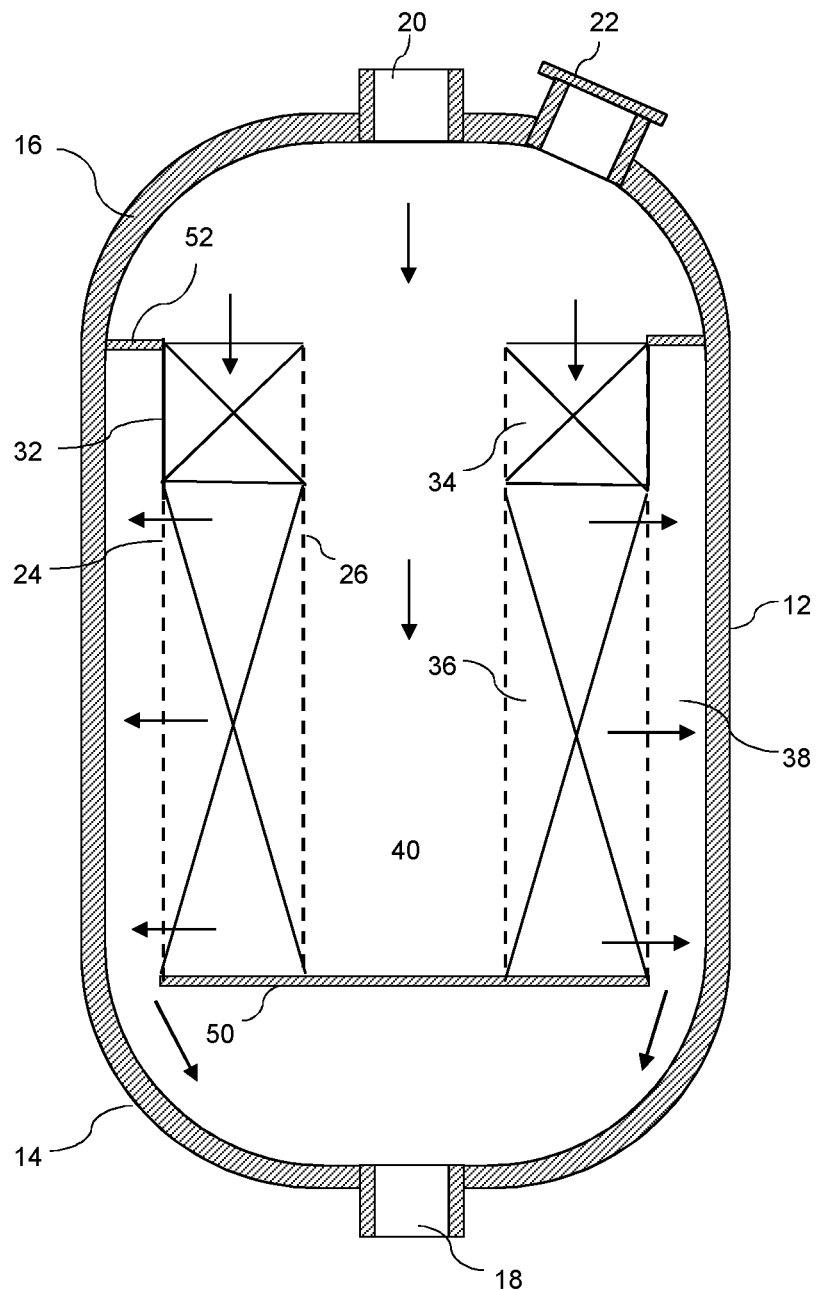

The invention is further illustrated by reference to the accompanying drawings in which;

FIG. 1 is a cross-section of a vessel according to a first embodiment of the invention; and FIG. 2 is a cross-section of a vessel according to a second embodiment of the invention.

In FIG. 1 a vessel adapted for axial and inward radial flow 10 comprises an elongate cylindrical shell 12 aligned vertically with a first domed end 14 at the bottom and a second domed end 16 at the top. The first end 14 has a process fluid outlet pipe 18 positioned in line with the vertical axis of the vessel. The second end has a process fluid inlet 20 also positioned in line with the vertical axis of the vessel and an adjacent catalyst loading port 22.

The shell 12 contains a containment means comprising an outer perforate cylinder 24 and an inner perforate cylinder 26, arranged coaxially within the shell and mounted between a first non-perforate circular baffle plate 28 near the second end 16 and a second non-perforate annular baffle plate 30 near the first end 14. The inner perforate cylinder 26 comprises an upper portion 32 without perforations. A catalyst, e.g. a water-gas shift catalyst is disposed between the inner 24 and outer 26 perforate cylinders. The portion 32 of the inner perforate cylinder 26 without perforations defines an axial-flow portion 34 of the bed. A radial-flow portion 36 of the bed is directly below the axial-flow portion 34. The diameter of the first circular baffle plate 28 is about that of the inner perforate cylinder 26. The second annular baffle plate 30 extends from the inside of the shell 12 to the inner perforate cylinder 26. A peripheral void 38 is formed between the outside of the outer perforate cylinder 24 and the inside wall of the shell 12. A central void 40 is formed within the inner cylinder 26. Although not shown, the catalyst may also be placed as a layer above baffle plate 28 although the outer perforate cylinder 24 would need to extend for the depth of the catalyst to prevent its ingress into the peripheral void 38.

The catalyst bed therefore comprises a radial-flow portion 36 and an axial-flow portion 34. The catalyst is loaded through loading port 22 by placing the first particulate catalyst in the radial-flow portion 36 and then placing the second catalyst in the axial-flow portion 34. In the present invention, the particle size of the second catalyst loaded into the axial-flow portion 34 is smaller than that of the first catalyst loaded into the radial-flow portion 36.

In use a process fluid, such as a synthesis gas mixed with steam, is fed into the vessel 10 via the process fluid inlet 20 in the second end 16 and is directed by baffle plate 28 to the surface of the catalyst in the axial-flow portion 34 and also to the peripheral void 38 within the shell 12. Baffle plate 30 prevents by-pass of the process fluid around the catalyst bed. The process fluid then passes axially through the axial-flow portion 34 of the catalyst bed and radially inwards through the radial-flow portion 36 of the catalyst to the central void 40. The resulting reacted process fluid is then directed to the process fluid outlet 18, from which the reacted process fluid may be recovered.

In FIG. 2 a vessel adapted for axial and outward radial flow comprises an elongate cylindrical shell 12 aligned vertically with a first domed end 14 at the bottom and a second domed end 16 at the top. The first end 14 has a process fluid outlet pipe 18 positioned in line with the vertical axis of the vessel. The second end has a process fluid inlet 20 also positioned in line with the vertical axis of the vessel and an adjacent catalyst loading port 22.

The shell 12 contains a containment means comprising an outer perforate cylinder 24 and an inner perforate cylinder 26, arranged coaxially within the shell and mounted between a first non-perforate circular baffle plate 50 near the first end 14 and a second non-perforate annular baffle plate 52 near the second end 16. The outer perforate cylinder 24 comprises an upper portion 32 without perforations. A catalyst, e.g. a water-gas shift catalyst is disposed between the inner 24 and outer 26 perforate cylinders. The portion 32 of the outer perforate cylinder 24 without perforations defines an axial-flow portion 34 of the bed. A radial-flow portion 36 of the bed is directly below the axial-flow portion 34. The diameter of the first circular baffle plate 50 is about that of the outer perforate cylinder 24. The second annular baffle plate 52 extends from the inside of the shell 12 to the outer perforate cylinder 24. A peripheral void 38 is formed between the outside of the outer perforate cylinder 24 and the inside wall of the shell 12. A central void 40 is formed within the inner cylinder 26.

The catalyst bed therefore comprises a radial-flow portion 36 and an axial-flow portion 34. The catalyst is loaded through loading port 22 by placing the first particulate catalyst in the radial-flow portion 36 and then placing the second catalyst in the axial-flow portion 34. In the present invention, the particle size of the second catalyst loaded into the axial-flow portion 34 is smaller than that of the first catalyst loaded into the radial-flow portion 36.

In use a process fluid, such as a synthesis gas mixed with steam, is fed into the vessel via the process fluid inlet 20 in the second end 16 and is directed by baffle plate 52 to the surface of the catalyst in the axial-flow portion 34 and also to the central void 40. Baffle plate 50 prevents by-pass of the process fluid around the catalyst bed. The process fluid passes axially through the axial-flow portion 34 of the catalyst bed and radially outwards through the radial-flow portion 36 of the catalyst to the peripheral void 38. The resulting reacted process fluid is then directed to the process fluid outlet 18, from which the reacted process fluid may be recovered.

In FIG. 1 and FIG. 2, the flow through the vessel is illustrated by the solid arrows (→).

The invention is further illustrated by reference to the following Example.

EXAMPLE 1

An axial-radial high-temperature shift vessel according to FIG. 1, having a catalyst bed with an axial-flow portion supported on a radial-flow portion was modelled. The first and second catalyst materials were chromia-promoted magnetite catalysts comprising acicular iron oxide particles as described in U.S. Pat. No. 5,656,566. The volume of the catalyst bed was as follows:

| Axial-flow portion | 4 m³ |
| Radial-flow portion | 40 m³ |

Reducing the shrinkage of the material in the axial section from 8% to 3% by using a smaller particle size catalyst reduces the risk of by-pass or the volume required by 5% or 0.2 m³.

Replacing the catalyst in the axial section with a smaller catalyst (i.e. Katalco$_{JM}$™ 71-5 to 71-5M or 71-6 to 71-6M) reduces the risk of bypass and/or the volume required by approximately 30% (1.2 m³) with little effect on the performance.

The properties of Katalco$_{JM}$™ 71-5, 71-5M, 71-6 and 71-6M are set out below. The catalysts are in the form of cylindrical pellets and each have a typical loaded density of about 1360 kg/m³.

| Catalyst | Katalco$_{JM}$™ 71-5 | Katalco$_{JM}$™ 71-5M | Katalco$_{JM}$™ 71-6 | Katalco$_{JM}$™ 71-6M |
| --- | --- | --- | --- | --- |
| Diameter (mm) | 8.5 | 5.4 | 8.3 | 5.2 |
| Length (mm) | 4.9 | 3.6 | 4.7 | 3.4 |

The invention claimed is:

1. A method for loading an axial-radial flow vessel containing a bed of a particulate catalyst having a radial-flow portion and an axial-flow portion supported on and in fluid communication with the radial flow portion, comprising:
   (i) placing a first catalyst material in the radial-flow portion; and
   (ii) placing a second catalyst material in the axial-flow portion, wherein the second catalyst material has a smaller particle size than the first catalyst material,
   wherein the vessel comprises a catalyst containment means placed within the vessel, said containment means comprising one or more perforate screens and non-perforate baffles that are capable of directing the flow of a process fluid from an inlet, through the axial-flow portion of the catalyst bed and then through the radial-flow portion of the catalyst bed and then to an outlet, and wherein the catalyst containment means are arranged within the vessel such that the process fluid entering through the inlet passes to the second catalyst in the axial-flow portion and passes to
      (a) a peripheral void from which it passes radially inwards through the first catalyst in the radial-flow portion to a central void or
      (b) a central void from which it passes radially outwards through the first catalyst to a peripheral void, from which it passes to the outlet.

2. The method according to claim 1, wherein a portion of the second catalyst material is replaced by the first catalyst material.

3. The method according to claim 1, wherein the first catalyst material is fed by gravity, vacuum, or pressure by a hose into the radial-flow portion of the vessel and then the second catalyst is fed by gravity, vacuum, or pressure by a hose into the axial-flow portion of the vessel.

4. The method according to claim 1, wherein the first and second catalysts are in the form of granules, pellets or extrudates.

5. The method according to claim 4, wherein the granules, pellets or extrudates have a width or diameter in the range 1-25 mm and an aspect ratio (i.e. length/diameter or width) of 6 or less.

6. The method according to claim 1, wherein the length and/or width and/or height of the second catalyst particles is 80% or less than that of the first catalyst particles.

7. An axial-radial flow vessel containing a bed of a particulate catalyst having a radial-flow portion and an axial-flow portion supported on and in fluid communication with the radial flow portion,
   wherein the bed comprises a first catalyst material in the radial-flow portion and a second catalyst material in the axial-flow portion and the second catalyst material has a smaller particle size than the first catalyst material,
   wherein the vessel further comprises a containment means placed within the vessel, said containment means comprising one or more perforate screens and non-perforate baffles that are capable of directing the flow of a process fluid from an inlet, through the axial-flow portion of the catalyst bed, through the radial-flow portion of the catalyst bed, and to an outlet,
   wherein the containment means are arranged within the vessel such that a process fluid entering through a process fluid inlet passes to the second catalyst in the axial-flow portion and to (i) a peripheral void from which it passes radially inwards through the first catalyst in the radial-flow portion to a central void, or to (ii) the central void from which it passes radially outwards through the first catalyst to the peripheral void, from which it is able to pass to a process fluid outlet.

8. The method according to claim 1, wherein the portion of the second catalyst material is less than 50% by volume of the axial-flow-portion.

9. The method according to claim 3, wherein the first catalyst material and second catalyst are fed using a dense-loading technique.

10. The vessel according to claim 7, wherein the containment means comprises an outer perforate cylinder and an inner perforate cylinder, said cylinders mounted within the vessel between two opposite non-perforate baffle plates, one baffle plate being of circular shape about the diameter of the inner cylinder and the other baffle plate being of annular shape with a width at least equal to the separation of the inner and outer cylinders.

11. The vessel according to claim 7, wherein the containment means comprises a plurality of rigid perforate chordal-, semi-circular- or C-shaped plates, or tubes formed by the plates and rigid non-perforate back-plates, that are arranged around the inside wall of a shell of the vessel in order to provide the peripheral void.

12. The vessel according to claim 10, wherein the inner cylinder comprises a section at one end without perforations so that the flow through the portion bounding this section is axial.

13. The vessel according to claim 7, wherein the catalyst containment means comprises an outer perforate cylinder and an inner perforate cylinder,
wherein said cylinders are mounted within the vessel between two opposite non-perforate baffle plates, one baffle plate being of circular shape about the diameter of the outer cylinder and the other baffle plate being of annular shape with a width equal to the separation of the outer cylinder from the inside of the vessel wall, and
wherein the peripheral void is formed between the outer perforate cylinder and the inside wall of a shell of the vessel, and the central void is provided within the inner perforate cylinder.

14. The vessel according to claim 13, wherein the catalyst containment means comprises a plurality of rigid perforate chordal-, semi-circular- or C-shaped plates, or tubes formed by the plates and rigid non-perforate back-plates, that are arranged around the inside wall of a shell of the vessel, wherein the peripheral void is formed.

15. The vessel according to claim 13, wherein the outer cylinder, plates, or tubes defining the peripheral void have a section without perforations so that the flow through the portion bounding this section is axial.

16. The vessel according to claim 7, wherein a perforate screen is between the first catalyst material and the second catalyst material.

17. The vessel according to claim 7, wherein the central void comprises a heat exchanger.

18. A process for performing a catalysed reaction, comprising passing a process fluid through a vessel according to claim 7.

19. The process according to claim 18, wherein the process fluid is a synthesis gas and the first catalyst and the second catalyst are a synthesis gas purification catalyst or synthesis gas conversion catalyst.

20. The process according to claim 19, wherein the synthesis gas conversion catalyst is a water-gas shift catalyst, methanation catalyst, methanol synthesis catalyst, or ammonia synthesis catalyst.

21. The process according to claim 20, wherein the water-gas shift catalyst is a copper-zinc alumina low-temperature shift catalyst, copper-zinc alumina medium-temperature shift catalyst, iron-containing high-temperature shift catalyst, or cobalt-containing sour shift catalyst.

* * * * *